F. C. ROBERTS.
FRUIT COOKER.
APPLICATION FILED JAN. 13, 1908.
932,905.
Patented Aug. 31, 1909.
3 SHEETS—SHEET 1.
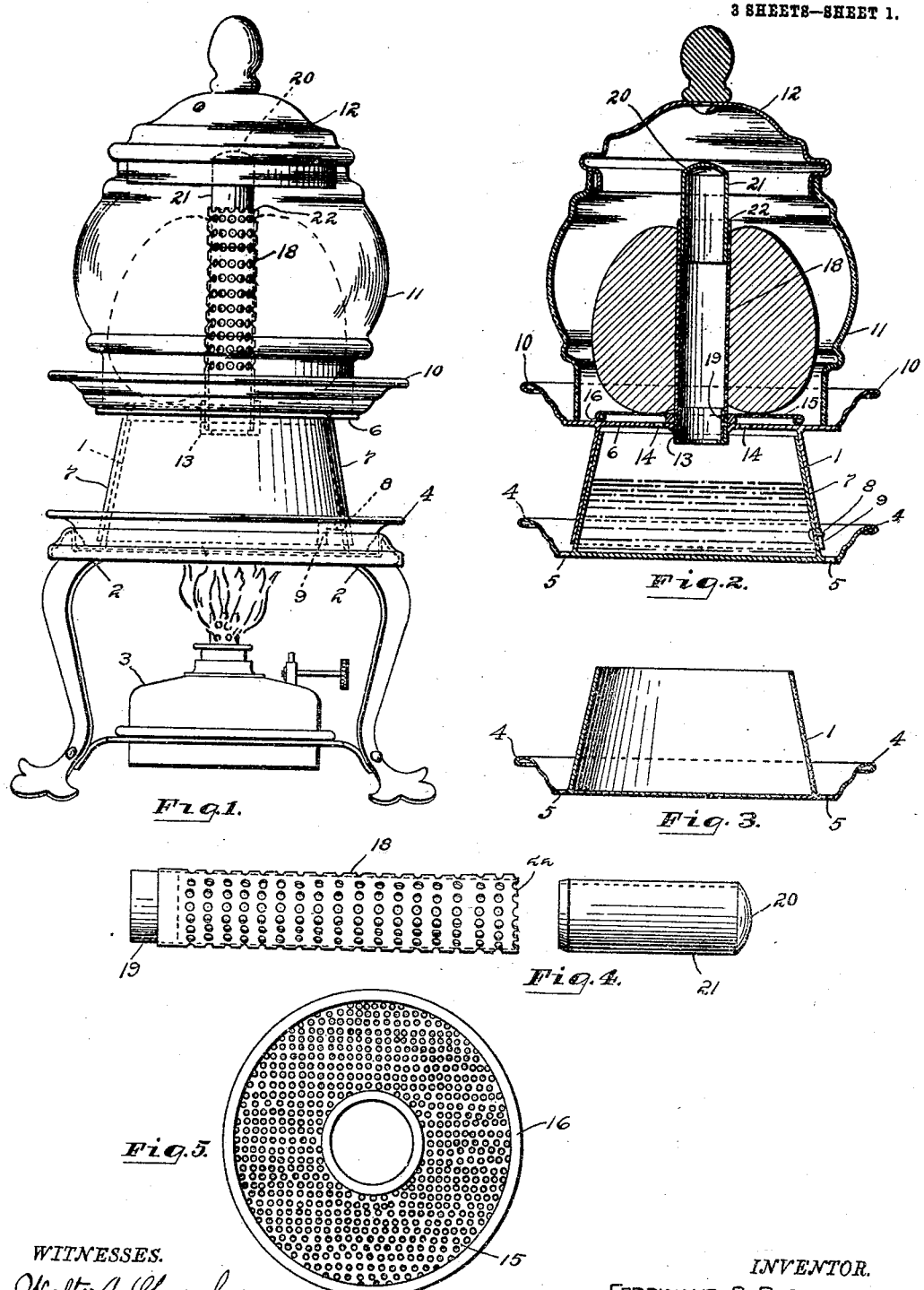
WITNESSES.
Walter A. Greenburg
A. M. Dorr.
INVENTOR.
FERDINAND C ROBERTS
By 
Attorneys.

F. C. ROBERTS.
FRUIT COOKER.
APPLICATION FILED JAN. 13, 1908.
932,905.
Patented Aug. 31, 1909.
3 SHEETS—SHEET 2.
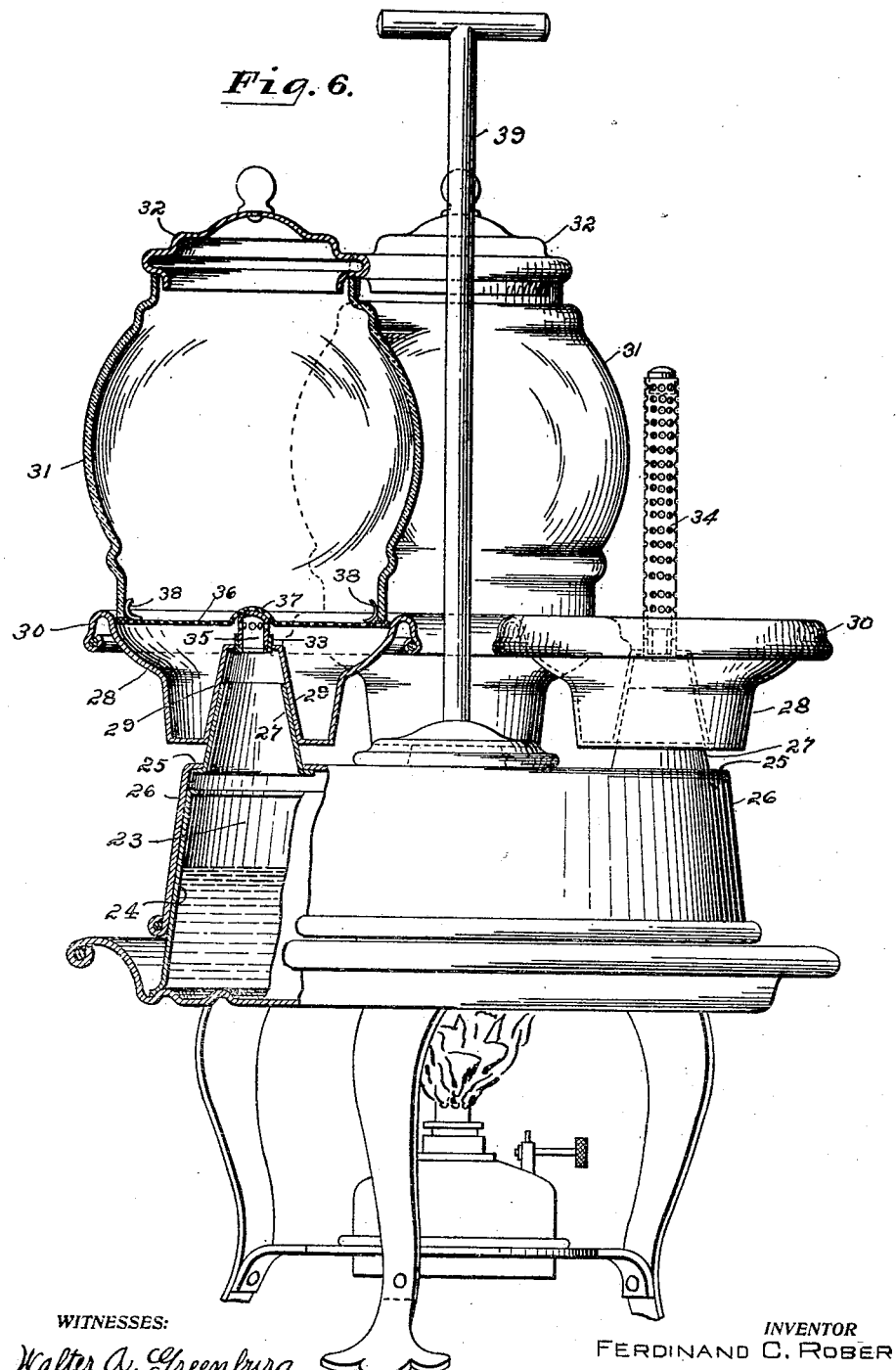
WITNESSES:
Walter A. Greenburg
A. M. Dorr.
INVENTOR
FERDINAND C. ROBERTS
BY 
ATTORNEYS F. C. ROBERTS.
FRUIT COOKER.
APPLICATION FILED JAN. 13, 1908.
932,905.
Patented Aug. 31, 1909.
3 SHEETS—SHEET 3.
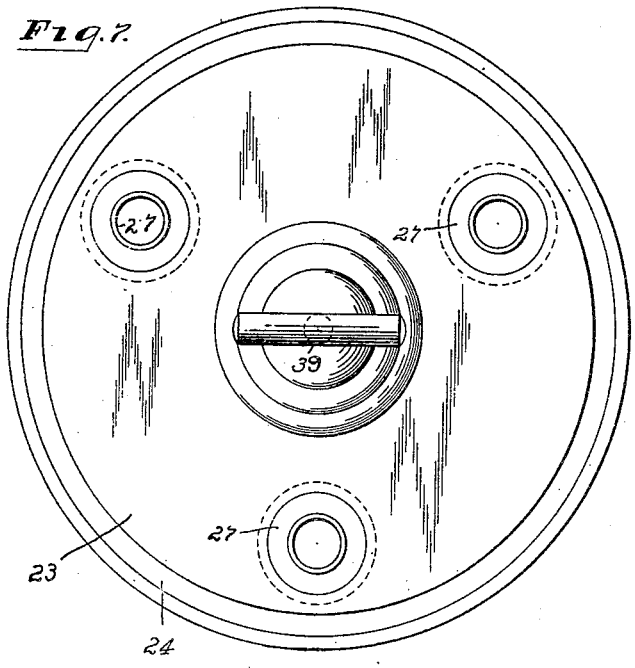
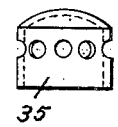
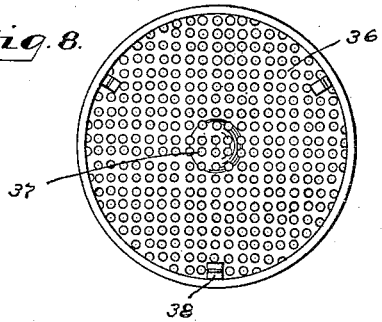
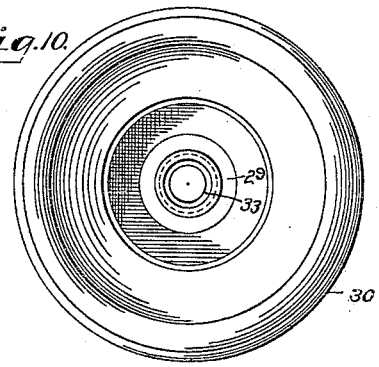
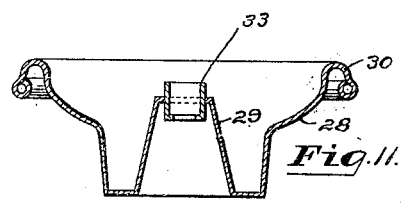
WITNESSES:
Walter A. Greenburg
A. M. Dow.
INVENTOR
FERDINAND C. ROBERTS
ATTORNEYS

UNITED STATES PATENT OFFICE.

FERDINAND C. ROBERTS, OF DETROIT, MICHIGAN.

FRUIT-COOKER.

932,905.   Specification of Letters Patent.   Patented Aug. 31, 1909.

Application filed January 13, 1908. Serial No. 410,528.

*To all whom it may concern:*

Be it known that I, FERDINAND C. ROBERTS, a citizen of the United States of America, residing at Detroit, in the county of Wayne and State of Michigan, have invented certain new and useful Improvements in Fruit-Cookers, of which the following is a specification, reference being had therein to the accompanying drawings.

This invention relates to a method of cooking apples, large fruit and vegetables of like character by direct application of steam to the interior of the fruit, and to means for accomplishing this in the form of a cooker which is preferably portable and is adapted for use on a dining table after the manner of a chafing dish.

The invention consists in the matters hereinafter set forth, and more particularly pointed out in the appended claims.

Referring to the drawings, Figure 1 is a view in elevation of a fruit cooker which embodies features of the invention. Fig. 2 is a view in longitudinal section of the cooker. Fig. 3 is a view in section in detail of a steam generator. Fig. 4 is an enlarged view in detail of a steam distributing pipe. Fig. 5 is an enlarged view in detail of a shelf. Fig. 6 is a view, partially in elevation, and partially in section, of a modified form of cooker having multiple steaming chambers and condensing pans, and a single steam generating chamber. Fig. 7 is a plan view of the form of generator for the multiple cooker. Fig. 8 is a plan view in detail of a screen for bulk material. Fig. 9 is a side view in detail of the screen. Fig. 10 is a plan view in detail of a condensing pan. Fig. 11 is a view in section of the condensing pan. Fig. 12 is a view in detail, enlarged, of a distributing cup for use with bulk material.

As herein illustrated as a preferred form for carrying out the process, a steam generator 1 is supported on a suitable standard 2 for ready application of any suitable source of heat, as for example, a lamp 3, an electric heating pad, or a gas burner.

The generator is preferably conoidal, and has a base flange 4 with perforations 5 through which the heat is free to ascend around the sides. A cover 6 for the generator has a deep flared flange 7 adapted to closely fit or telescope with the inclined or tapered walls and be interlocked therewith as by a stud 8 and L-slot 9 forming in effect a bayonet-lock, or any other convenient connection may be used which will give a steam tight joint. A dished rim 10 on the plate acts as a retaining ledge for a circular casing 11 preferably of glass, which, with a lid 12 removably seated in its upper end, forms a steam chamber above the cover 6. The latter has a central tubular socket 13 around which are a plurality of small drain apertures 14, and a shelf 15 of perforated metal or wire gauze is supported at an interval above the apertures by its rolled rim 16 or other suitable means, a central aperture therein being engaged by the socket 13.

A tube 18 having a reduced or shouldered lower end 19 adapted to telescope with the plate socket, and be supported thereby in an upright position, is perforated for the major portion of its length, and may be closed at its upper end by a cap 20 having a flange 21 telescoping with the tube. The annular margin 22 of the upper end of the tube is preferably sharp.

To increase the capacity of the cooker, and to permit simultaneous cooking of different articles and preserve their separate flavors, it may be constructed as indicated in Figs. 6 to 12. In this form, a circular steam generator 23 having a conoidal wall 24 is closed by a cover 25 whose rim 26 is adapted to telescope with the wall and form a steam tight joint. A plurality of conical tubes 27 are disposed symmetrically in the cover top and each forms a support for a condensing pan 28 having a central core 29 telescoping with the tube 27 and a flaring rim 30 adapted to receive a glass casing or bell 31 similar to the single chamber casing 11, with cover 32. A ferrule 33 set in the mouth of the core acts as a socket for a distributing pipe 34 similar in all respects to the tube 18.

If used for bulk material, such as rice or the like, the tube 18 or pipe 34 is replaced by a perforated cap 35 and a screen 36 of wire or perforated metal with raised center 37 to fit the cap and arms 38 to steady it against the casing, is used instead of the regular shelf 15.

A central handle 39 is added for convenience in carrying the cooker.

In operation, the fruit to be cooked is either cored by proper means to closely fit the central perforated steam distributing tube, or the latter may be used as a corer and the fruit afterward impaled directly thereon, the cap being pushed in or out to close all apertures outside of the fruit. The tube is then placed in its socket and the steam chamber closed. By applying heat to the water filled generator, steam is forced evenly through the body of the fruit throughout its length, the expelled juices and water of condensation draining into the generator in the single type cooker or into the condensing pan in the multiple cooker, where they may be boiled down if desired and used as a dressing for the fruit. The permeating of the fruit in this manner by the steam rapidly and evenly cooks it as the inner older tissues which need the longest cooking are first affected and later the outer, younger and softer cells. The steam also loosens and disrupts the skin so it is readily removed. The condensed steam and fruit juice keeps the drain holes in the cover partially sealed and restricted so that the steam is forced to pass through the orifices of the distributing pipe directly into the body of the fruit.

The chamber surrounding the fruit or vegetable is not necessary, save as it traps or condenses the steam and enables the cooker to be used for ordinary steaming wherein bulk material, such as rice or the like, is to be cooked by application of steam from without. Where the steam is introduced into the interior of fruit and forced outwardly therethrough, the steam is not necessarily confined after it leaves the fruit, as the cooking is done from within and the result is the same if the chamber be left off and the steam allowed to dissipate as it leaves the article.

When so desired, the lower end of the steam distributing tube of the single cooker may be coupled directly to a pipe connected with a convenient source of steam and the portable generator herein described may be used merely for trapping the juice and condensed steam.

One feature of the invention is the trapping of the water of condensation by the tapering wall of the generator and, in the multiple form, of the condenser pan tubes with their inset sockets, the moisture running back out of the direct path of the steam toward the side of the vessel, and any drops at the top being arrested by the depending socket rim, the steam reaching the fruit in comparatively dry form that the fruit cells around the steam distributing pipe are not filled with water and the progress of the steam prevented. Another feature is the extremely rapid action of the cooker, which makes both forms available for restaurant use where they may be placed on the table like a chafing dish and the food prepared while the earlier courses of a meal are being served. A further feature is the even method of forcing and distributing the steam outwardly through the tissues reaching the older harder ones first and the others later.

Obviously, changes in the details of construction may be made without departing from the spirit of the invention, and I do not limit myself to any particular form or arrangement of parts.

What I claim as my invention is:—

1. The method of cooking an individual fruit or vegetable which consists in introducing steam into a cavity formed in the interior of the fruit or vegetable and forcing it outwardly through the body thereof.

2. The method of cooking an individual fruit or vegetable which consists in forming a cavity in the interior thereof, of introducing steam into the cavity and forcing it outwardly through the body thereof.

3. The method of cooking an individual fruit or vegetable which consists in introducing steam into a cavity in the interior of the fruit or vegetable, and forcing it outwardly through the body thereof, the steam being unconfined after leaving the fruit or vegetable.

4. The method of cooking an individual fruit or vegetable which consists in impaling a fruit or vegetable on a perforated steam pipe and forcing steam therefrom outwardly through the body of the fruit or vegetable.

5. The method of cooking an individual fruit or vegetable which consists in impaling said fruit or vegetable on a perforated steam pipe and forcing steam therefrom outwardly through the body of the fruit or vegetable, the steam being unconfined after leaving the fruit or vegetable.

6. In a cooker, a steam generator having a convergent wall, a cover telescoping therewith, a socket in the cover, an apertured steam distributing tube adapted to be seated in the socket, a longitudinally adjustable cap closing its upper end, and a substantially cylindrical removable casing on the cover concentric with the tube, and a lid on the casing.

7. In a cooker, a steam generator having a cylindrical tapered wall, a flanged cover telescoping with the generator, a socket in the cover, a steam distributing tube having a lower open end adapted to be seated in the socket, a perforated body adapted to be thrust through the body of an article to be cooked, and a longitudinally adjustable cap closing the upper end of the tube, a perforated shelf at an interval above the cover adapted to be centrally engaged by the socket, a circular casing on the cover, and a removable lid on the upper end of the casing forming therewith a steam chamber inclosing the tube.

8. A cooker comprising a steam generator having a convergent wall, a cover therefor having a rim adapted to close over the wall, and a socket, a plurality of conical tubes extending from the cover, a condenser pan removably secured on each tube by a central core telescoping with the tube, a ferrule secured in the upper end of each core, a perforated screen adapted to be centrally engaged by the socket, a perforated steam distributing tube adapted to be thrust through the body of an article to be cooked, detachably secured by its lower end in each ferrule, an adjustable cap closing the upper end of the tube, a circular casing resting on the rim of each pan, and a lid closing the upper end of each casing.

9. A portable fruit and vegetable cooker comprising a standard, a circular steam generator thereon having a convergent wall, a cover therefor having a rim closing tightly on the wall, a plurality of conical tubes extending from the cover, a condenser pan on each tube consisting of a rimmed flaring body having an axial core adapted to closely fit over the tube and provided at its upper end with an inner annular flange, a ferrule secured in the flange, a steam distributing tube having a shouldered lower end adapted to be seated in the ferrule, a perforated body adapted to be thrust through an article to be cooked and an adjustable cap closing the upper end of the tube, a perforated circular screen removably secured on each ferrule, a circular glass casing seated on the rim of each condenser pan, and a lid on the upper end of each casing.

10. In a cooker, a steam generator, a cover removably secured thereon, a socket in the cover, a steam distributing tube having a reduced lower open end adapted to be seated in the socket, an apertured body and a longitudinally adjustable cap closing its upper end, a substantially cylindrical removable casing on the cover concentric with the tube, and a lid on the upper end of the casing.

In testimony whereof I affix my signature in presence of two witnesses.

FERDINAND C. ROBERTS.

Witnesses:
C. R. STICKNEY,
A. M. DOW.